March 11, 1958 J. D. JONES 2,826,476
APPARATUS FOR PLOTTING A COURSE
Filed April 5, 1954 2 Sheets-Sheet 1
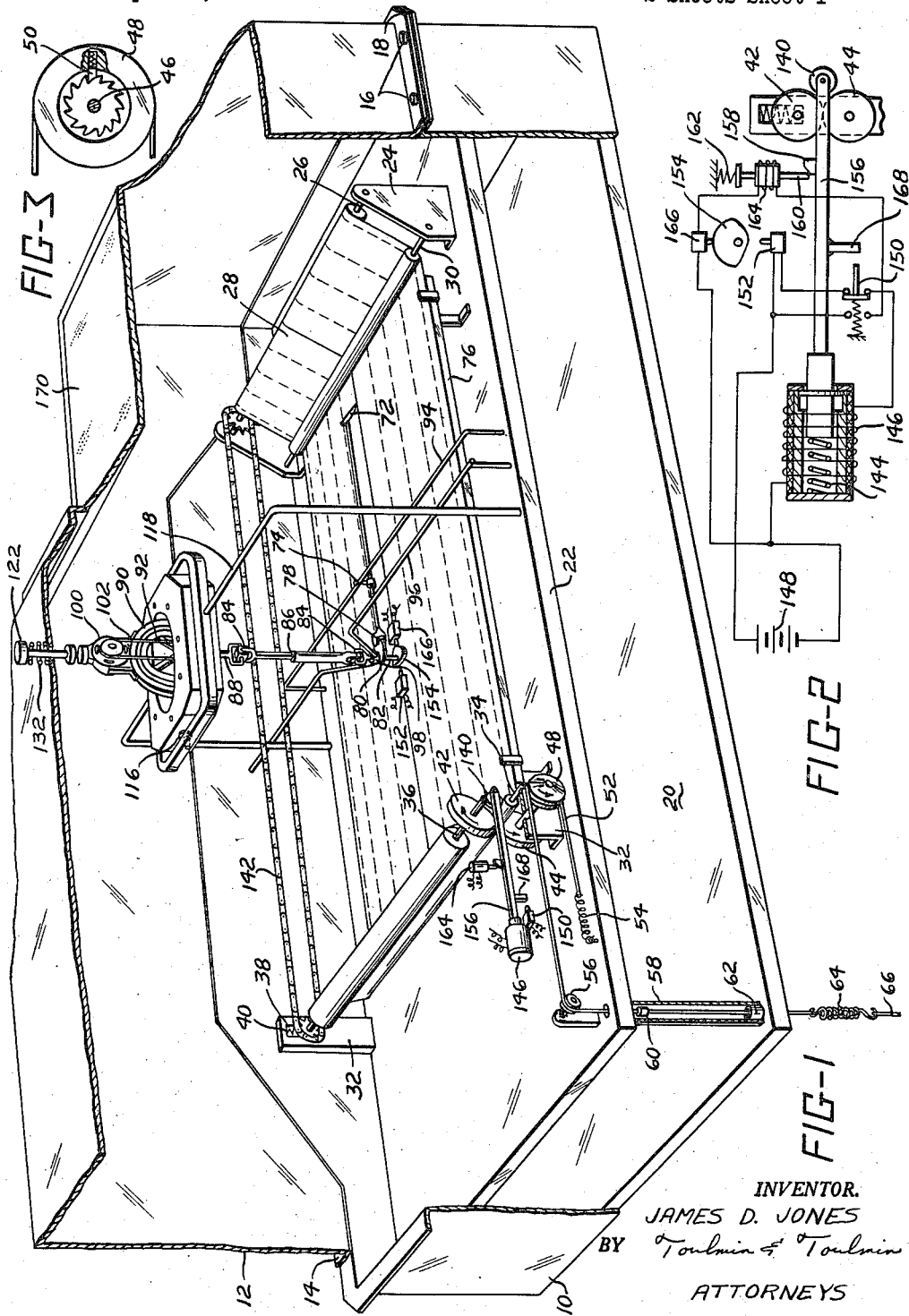
INVENTOR.
JAMES D. JONES
BY Toulmin & Toulmin
ATTORNEYS March 11, 1958  J. D. JONES  2,826,476
APPARATUS FOR PLOTTING A COURSE
Filed April 5, 1954  2 Sheets-Sheet 2
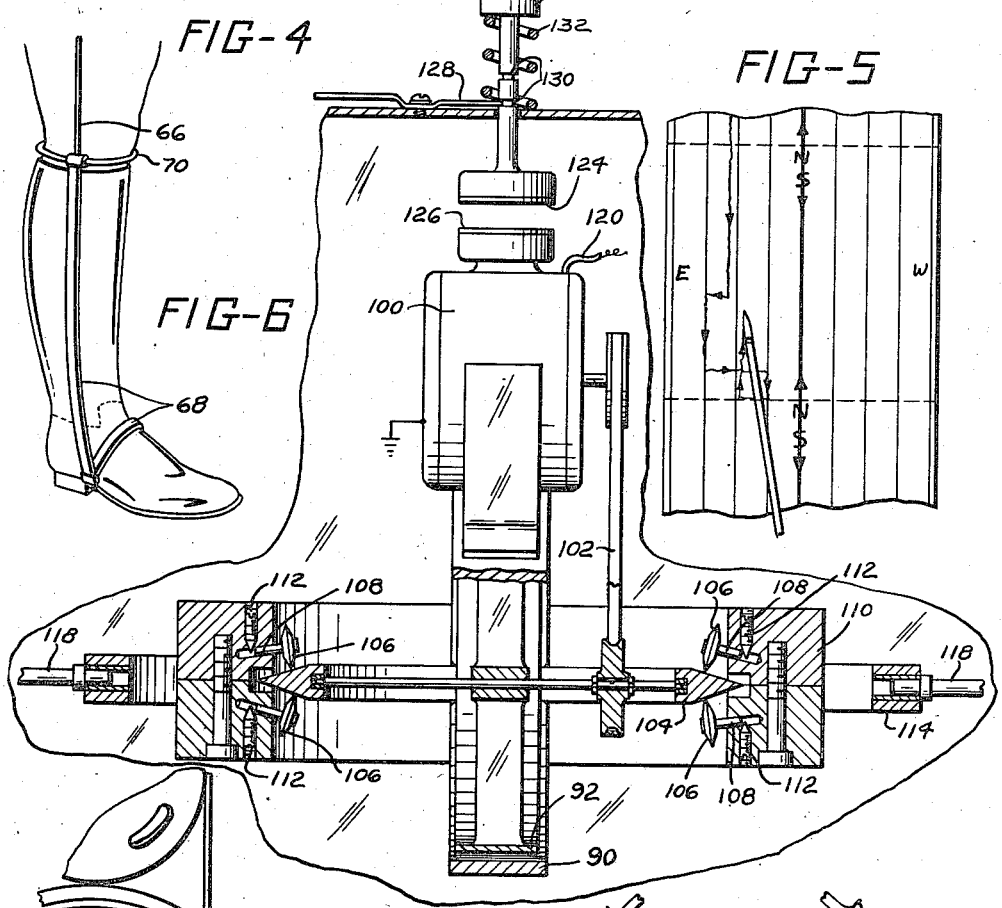
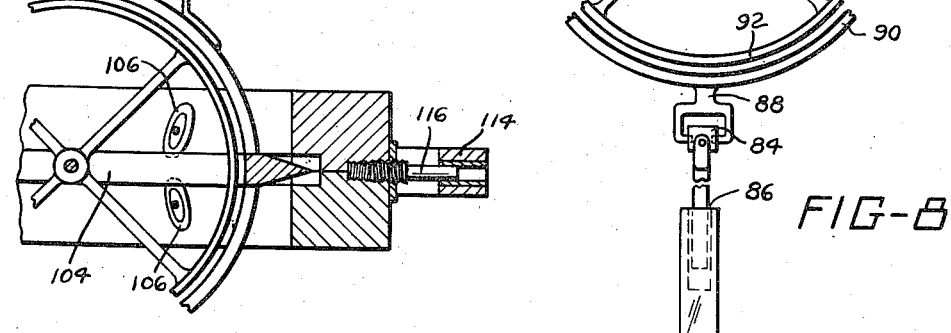
INVENTOR.
JAMES D. JONES
BY Toulmin & Toulmin
ATTORNEYS

United States Patent Office 2,826,476
Patented Mar. 11, 1958

2,826,476

APPARATUS FOR PLOTTING A COURSE

James D. Jones, Charleston, W. Va.

Application April 5, 1954, Serial No. 421,135

3 Claims. (Cl. 346—8)

This invention relates to a course plotting instrument, and particularly to a portable instrument of the nature adapted for being carried by an individual for plotting a map of the course travelled by the individual.

In many instances an individual will be travelling over unknown terrain, such as in connection with military operations, on hunting expeditions, or when camping out or exploring. Under circumstances of this nature, and still other instances where substantially the same circumstances are involved in that an unknown terrain is being traversed, it is quite difficult to be certain of one's location or to be able to determine the course followed with any degree of accuracy.

Such information could, at times, be extremely important, such as in mapping out the location of a mineral deposit, or of a military objective, or simply for the purpose of finding one's way back and forth between a known location and a remote location which is otherwise uncharted.

It has been known to have course plotting devices which would draw charts of the terrain over which the device was conveyed, but heretofore such devices have been complex and expensive and have not been adapted for use by individuals.

Having the foregoing in mind, it is a primary object of the present invention to provide a device for plotting and charting a course which is relatively small, light and inexpensive, thus making it practical for an individual to purchase and carry such a device.

It is another object of the present invention to provide a device for plotting a course and drawing a chart thereof which is small enough to be carried by an individual and which has a movable chart that is driven according to the rate of travel of the individual carrying the device.

A further object of the present invention is the provision of a device for plotting and drawing a chart of a course and including means for viewing the chart so that an observer can immediately determine the instantaneous position of the device and also permitting the device to be supplied with a chart having a course drawn thereon, and which course can be followed by observing the chart as the device is conveyed along the course.

A still further object of the present invention is the provision of a small, compact and inexpensive device of the nature referred to which includes its own power supply, whereby it can be employed where there is no external source of power whatsoever.

A further particular object of the present invention is the provision of a device of the nature referred to which is arranged so that it can easily be serviced or repaired.

The several objectives referred to above are attained, in brief, by providing a housing within which there is a movable chart and within which housing there is a compass; specifically a gyroscopic compass with the compass controlling a scribing point that bears on the chart for drawing a trace on the chart as the chart moves relative to the scribing point. Motive power is advantageously provided for driving the chart by the individual carrying the device, but this invention also comprehends the driving of the chart by a motor or other controlling power means. The direction of movement of the chart is determined by the gyroscopic compass which selects between two opposite directions of movement of the chart.

According to this invention the device includes batteries as a power supply, and this is preferred because it enables the device to be employed in locations where no other power is available, but it will be understood that the device could derive power from other sources such as from an automobile battery or generator when circumstances permitted.

The several objects and advantages referred to above, as well as still other objects and advantages of this invention, will become more apparent upon reference to the following specification taken in connection with the accompanying drawings, wherein:

Figure 1 is a perspective view partly in section showing a device according to my invention;

Figure 2 is a diagrammatic showing of the reversing mechanism associated with the chart of the device;

Figure 3 is a fragmentary view showing a portion of the chart drive;

Figure 4 is another fragmentary view showing the manner in which the chart drive can be arranged for actuation by the leg of the individual carrying the device;

Figure 5 is a fragmentary view showing a typical chart drawn by the device;

Figure 6 is a sectional view showing the mount for the gyroscopic compass;

Figure 7 is a view showing a pivotal support for the frame in which the compass is mounted; and Figure 8 is a view showing a flexible drive extending from the cage of the gyroscopic compass to the mechanism for controlling the scribing point and the direction of movement of the chart.

Referring to the drawing somewhat more in detail, the device shown in Figure 1 comprises an outer case consisting of a lower portion 10 and an upper portion 12 flanged as at 14 and secured together by screws 16 with gasket means 18 between the flanges to seal the interior of the housing.

The bottom part 10 of the housing includes a compartment 20 adapted for receiving batteries for supplying power to parts of the device.

Immediately above battery compartment 20 is a support platform 22 which, at one end, has bracket means 24 upstanding therefrom rotatably supporting a first shaft 26 on which is wound a chart 28, and a second shaft 30 which supports an idler roller under which the chart passes.

Adjacent the opposite end of platform 22 is another pair of upstanding bracket means 32, each of which rotatably supports one end of an idler roller 34 under which the chart passes toward the shaft 36 about which the chart is wound similarly to the support of the chart on shaft 26.

The opposite ends of shaft 36 are movably supported in their respective bracket means as by extending into a slot 38 therein and being urged downwardly in the said slot by spring means 40.

At the one end of shaft 36 it carries a drive wheel 42 which is pressed against driving wheel 44 by the spring means 40 pertaining to that end of shaft 36. Driving wheel 44 is fixed to a shaft extending through bracket means 32, and at its outer end (Figure 3) the shaft carries the ratchet wheel 46 that is surrounded by a driving block member 48 carrying one or more spring pressed pawls 50.

A driving band, such as a belt, cord, or chain at 52 passes about driving block 48 whereby, by reciprocation of the driving band 52, the ratchet wheel 46 will be driven and therethrough the wheel 44 will be driven, and this, in turn, will drive drive wheel 42 on shaft 36.

On one side of driving block 48 band 52 is connected through tension spring 54 with platform 22, while on the other side of driving block 48 band 52 passes over an idler roller 56 and then downwardly to a tube 58 mounted in one corner of compartment 20. Within tube 58 band 52 carries a stop collar 60 adapted for abutment with a stationary stop collar 62 mounted within tube 58.

Beneath stop collar 62 band 52 is connected by a tension spring 64 with a flexible element 66. Flexible element 66, as will be seen in Figure 4, is adapted for being connected with the leg of the individual carrying the device, and to this end the flexible element 66 may include the stirrup portion 68 and strap 70, by which it can be attached to the individual's leg carrying the device, as illustrated in Figure 4, whereby, as the individual walks, the chart drive will be actuated.

Located above the chart 28 bearing on the horizontal portion thereof extending between idler rollers 30 and 34 is a scribing point 72 which is pivoted as at 74 for movement laterally of the chart. The chart in this region is advantageously supported on a table element 76 supported on platform 22.

At the end opposite scribing point 72 the scribing member has a cam follower 78 bearing on the periphery of a rotatable cam 80 carried on a shaft 82 which is connected through the universal joints 84 and slip joint 86 with a shaft 88 that extends from the bottom of a cage ring 90 surrounding the rotatable flywheel 92 of a gyroscopic compass.

As cam 80 turns the scribing point 72 will move over the chart 28 to a position corresponding to the position of the gyroscopic compass whereby the trace that is drawn on the chart can be employed for determining the true position of the device at any instant for permitting the flying of the true course.

The pivotal support 74 for the scribing member is attached to a bracket element 94 supported on platform 22, and platform 22 also supports bracket element 96 which at about the middle thereof has fixed thereto a bearing 98 which has in about the middle thereof a bearing member in which the shaft 82 is journalled.

The gyroscopic compass previously referred to includes an electric motor 100 connected by belt 102 with the flywheel of the compass so that energization of the motor will drive the flywheel at the proper speed.

The cage member 90 of the compass has fastened thereto a ring 104, as best seen in Figures 6 and 7, which has a beveled peripheral edge that is engaged by the roller 106. Each roller 106 has its own supporting shaft 108 fitted into a drilled hole in a support ring 110, with the shafts 108 being inclined from the horizontal at a smaller angle than the head portion of ring 104. The set screws 112 associated with shafts 108 permit axial adjustment thereof to take up for play and clearance between ring 104 and the knife-edged supporting rollers.

Surrounding support ring 110 is a second support ring 114 and there is a pivotal connection on one axis between the rings 110 and 114 as indicated at 116 in Figure 1, and on an axis at right angles thereto there is a pivotal connection 118 between outer support ring 114 and the case of the device.

The pivots 118 and 116 permit tilting of the device without destroying the effectiveness of the gyroscopic compass.

A flexible wire 120 connects the motor 100 with one side of the battery power supply, and on the other side of the motor the power supply is grounded to complete a circuit.

For initially setting the gyroscopic compass a conventional magnetic compass can be employed, and when a true direction has been established the gyroscopic compass can be turned to the proper position by availing of an adjusting knob 122 having a friction member 124 on the bottom thereof adapted for engagement with the friction member 126 on top of motor 100.

A latch 128 is adapted for engagement with notch means 130 in the adjusting member for locking the adjusting member in spaced relation with the gyroscopic compass or for locking the adjusting member in position to hold the gyroscopic compass fixed for transporting the device. A spring 132 normally urges the adjusting member toward its retracted position.

It has been mentioned previously that the chart drive is of a reversible nature, and this is necessary in order to accommodate for directional changes of more than 180° in the course. The change in direction of the chart drive, according to the present invention, may be accomplished as illustrated in Figure 2 wherein an idler roller 140 is provided adapted for being drawn in between driving wheel 44 and drive wheel 42.

Where idler roller 140 is shown in Figure 2 the drive of the chart is forward, but with idler roller 140 drawn between wheels 42 and 44 the direction of rotation of wheel 42 would be reversed and this would cause reverse movement of the chart by reason of the chain connection at 142 in Figure 1 that connects shafts 20 and 36.

Idler roller 140 is normally urged toward its Figure 2 position by a spring 144 and is adapted for being drawn into the space between wheels 42 and 44 by energization of the solenoid 146. Solenoid 146 is connected in circuit with battery 148 through a normally closed switch 150 and a normally open switch 152. Switch 152 is adapted for being closed by a cam 154 on shaft 82 so that when the gyroscopic compass reaches a certain position the drive to the charts will instantly be reversed by actuation of the idler roller 140 by solenoid 146.

According to this invention, in order to relieve the battery 148 of load, the rod 156 that connects the armature of solenoid 146 with idler roller 140 includes a latch member 158 adapted for latching engagement with a plunger 160 normally urged for latching engagement by a spring 162 adapted for being retracted by energization of a solenoid 164 that is in circuit with a normally open limit switch 166 and a normally open set of blades associated with limit switch 150.

Limit switch 166 is adapted for actuation by cam 154 and switch 150 is adapted for actuation by element 168 on rod 156.

In operation, when switch 152 is closed by cam 154, solenoid 146 is energized thereby to draw rod 156 and idler roller 140 leftwardly to position the idler roller 140 between driving wheel 44 and drive wheel 42. This movement of rod 156 will cause latch member 158 to be engaged by latch member 160 while simultaneously element 168 will move switch 150 to open the normally closed contacts thereof and close the normally open contacts thereof. This will de-energize solenoid 146 to relieve the battery 148 of load.

When the gyroscopic compass again turns to the point where cam 154 will close switch 166 a circuit will be completed through solenoid 164, and the previously closed contacts of switch 150 will thus energize the said solenoid and retracting latch member 160 so that spring 144 will return the idler roller to its Figure 2 position.

It will be apparent that a suitably powerful gyroscopic compass could accomplish the reversing of the chart purely by mechanical means. It will, therefore, be understood that the electrical arrangement shown in Figure 2 is merely exemplary of the different ways in which the chart drive can be reversed in response to the gyroscopic compass reaching a certain position.

From the foregoing it will be apparent that what is provided by the present invention is a relatively small, simple, compact and inexpensive course, flying and charting device that can readily be carried and actuated by an individual. The chart 28 can be viewed through the window 170 provided in the case of the device whereby the direction of the device can instantly be determined, or with a chart having a course plotted thereon.

Mounted in the device the observing thereof through the window 170 will permit the individual carrying the device to follow a predetermined course thereby to arrive at a predetermined location.

The device has been illustrated as one adapted for being manually carried and containing its own source of power. It will be evident however, that the device is also adapted for use in connection with aircraft or a land vehicle to derive power therefrom for driving the gyroscopic compass, and for actuating the chart at a speed and in a direction that will be indicative of the direction of movement of the craft and the rate of travel thereof.

It will be understood that this invention is susceptible to modification in order to adapt it to different usages and conditions and, accordingly, it is desired to comprehend such modifications within this invention as may fall within the scope of the appended claims.

I claim:

1. In a course plotting instrument; a case adapted for being carried by an individual, a chart in the case, drive means for moving the chart in the case, means operated by walking movements of the individual for actuating said drive means, a scribing point in the case arranged to draw a trace on the chart, compass means in the case connected with said scribing point for moving it over the chart at right angles to the movement of the chart, said scribing point being movable between predetermined limits less than the width of the chart, said drive means including reversing means operated by said compass so the chart moves in one direction during 180° of travel of the compass in the device, and in the opposite direction during the other 180° of travel of the compass whereby the direction of travel is indicated by the scribing point and the distance travelled is indicated by the movement of the chart thus permitting travel in any direction up to the limit of the length of the chart without adjustment of the mechanism.

2. In an instrument of the nature described; a case, a chart in the case, a member rotatable to drive the chart, a ratchet wheel connected to the member, a pulley member having a ratchet pawl engaging said ratchet wheel, a drive band around the pulley having a tension spring connected to one end, the other end extending from the case, said tension spring having the end opposite its connection with said band anchored to the case, and means to attach the said other end of the band to the leg of an individual carrying the instrument for reciprocation of the band when the individual walks.

3. In an instrument of the nature described; a case, a chart in the case, a member rotatable to drive the chart, a ratchet wheel connected to the member, a pulley member having a ratchet pawl engaging said ratchet wheel, a drive band around the pulley having a tension spring connected to one end and the other end extending from the case, said tension spring having the end opposite its connection with said band anchored to the case, means to attach the said other end of the band to the leg of an individual carrying the instrument for reciprocation of the band when the individual walks, a spring in the band between the pulley and the leg connection, and interengageable stop elements on the band and case to limit the travel of the portion of the band engaging the pulley.

References Cited in the file of this patent

UNITED STATES PATENTS

| 2,149,440 | Jackson | Mar. 7, 1939 |
| 2,598,096 | Bailly | May 27, 1952 |
| 2,607,996 | Moyer | Aug. 26, 1952 |
| 2,690,951 | Moore | Oct. 5, 1954 |

FOREIGN PATENTS

| 36,739 | Norway | Feb. 5, 1923 |